Patented Aug. 30, 1932

1,875,088

UNITED STATES PATENT OFFICE

PAUL W. MERCHANT, OF PORT ARTHUR, TEXAS, ASSIGNOR TO THE TEXAS COMPANY, OF NEW YORK, N. Y., A CORPORATION OF DELAWARE

TREATMENT OF LEAD SLUDGE

No Drawing. Application filed August 24, 1929. Serial No. 388,253.

This invention relates to the recovery of treating agents containing lead compounds that have been employed for treating hydrocarbon oils.

When sodium plumbite or the so called doctor solution is employed in sweetening hydrocarbon oils the reagent loses its activity after it has been used for a time, the material becoming masked in some way so that it is no longer useful in the sweetening reaction or being largely converted into a lead sulphide sludge which may be non-reactive as a sweetening agent. Similarly when the treating operation is started by the use of a lead-sulphide-caustic suspension in the first instance the material after a time may lose its activity and be no longer useful as a sweetening agent.

In accordance with my invention the spent lead treating agent is subjected to distillation to distill off any water or oil that may be contained in the material as withdrawn from the treating vessel and is then subjected to spontaneous oxidation to effect conversion of lead sulphide into lead oxide.

In a preferred manner of practicing the invention the spent lead sulphide treating agent which, if desired, may be previously freed from the major portion of the liquids by well-known or preferred methods of settling or filtering is introduced into a still and heated to distill off its oil and water content. The oil obtained in the distillate may thus be recovered. Distillation is preferably carried on rather rapidly and continued until a dark porous or solid residue is left in the still. This solid residue is then withdrawn and preferably spread out in a thin layer while exposed to the atmosphere with the result that spontaneous oxidation takes place and conversion of lead sulphide into lead oxide. The recovered material which may comprise predominantly lead oxide may then be admixed with a suitable caustic solution in order to form fresh sodium plumbite with which to treat additional quantities of hydrocarbon oils.

Obviously many modifications and variations of the invention, as hereinbefore set forth, may be made without departing from the spirit and scope thereof, and therefore, only such limitations should be imposed as are indicated in the appended claims.

I claim:

1. The method of treating lead sludge, resulting from sweetening hydrocarbon oils with doctor solution, to recover the lead compounds which comprises subjecting the sludge to distillation to distill off the oil and water and to produce a residue which is oxidizable on exposure to the atmosphere, then subjecting the residue to spontaneous oxidation to convert the residue to caustic alkali soluble compounds.

2. The method of treating lead sludge, resulting from sweetening hydrocarbon oils with doctor solution, to recover the lead compounds which comprises subjecting the sludge to distillation to remove the oil and water therefrom and to produce a porous solid residue which will spontaneously oxidize on exposure to air, then withdrawing the residue, from the still and exposing it to the atmosphere in a thin layer to effect spontaneous oxidation of the lead compounds to caustic soluble products.

In witness whereof I have hereunto set my hand this 19th day of July 1929.

PAUL W. MERCHANT.